Mar. 13, 1923.
W. A. DARRAH
1,448,654
METHOD OF PRODUCING OXYGEN AND APPARATUS THEREFOR
Filed Feb. 28, 1919
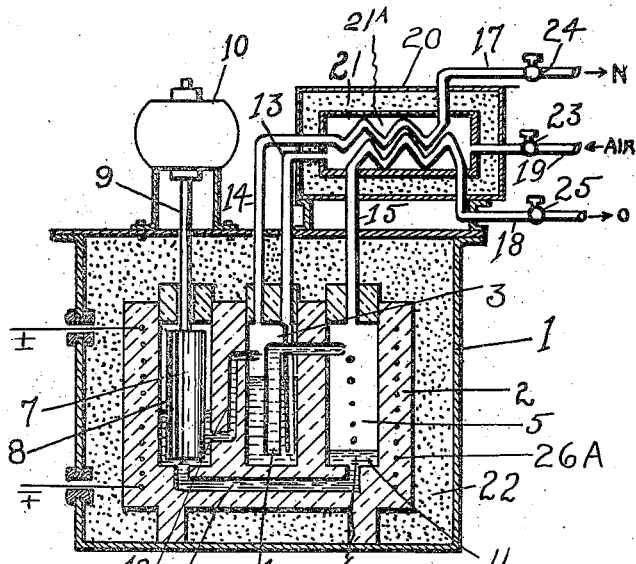
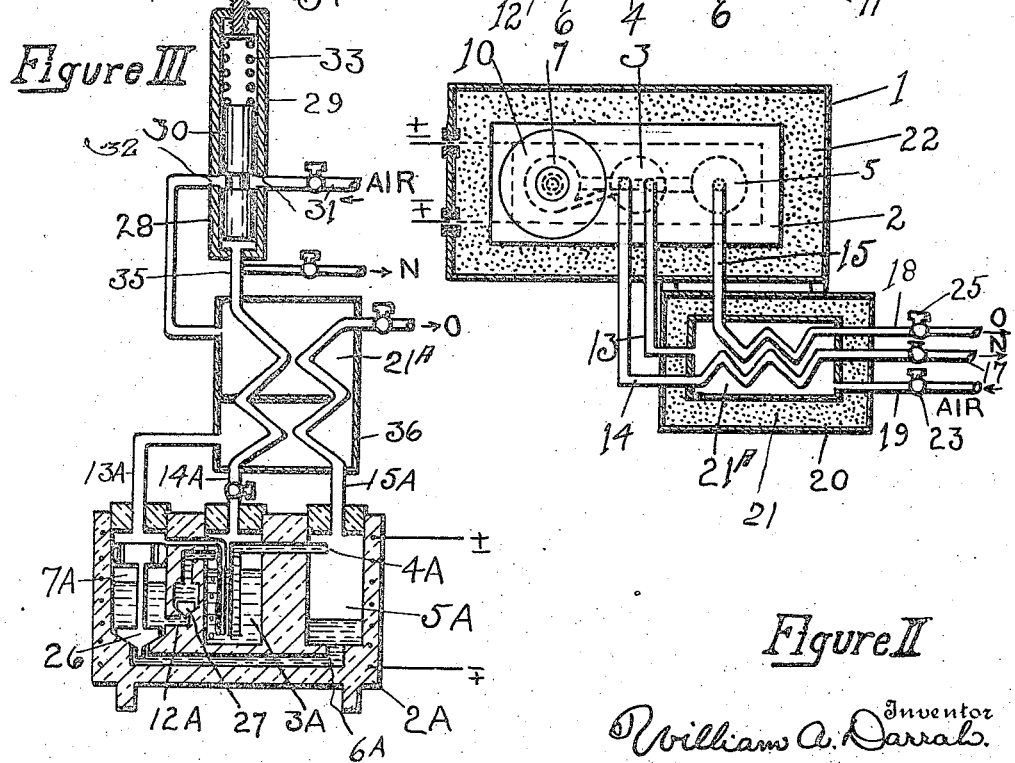

Patented Mar. 13, 1923.

1,448,654

UNITED STATES PATENT OFFICE.

WILLIAM A. DARRAH, OF CHICAGO, ILLINOIS.

METHOD OF PRODUCING OXYGEN AND APPARATUS THEREFOR.

Application filed February 28, 1919. Serial No. 279,898.

*To all whom it may concern:*

Be it known that I, WILLIAM A. DARRAH, a citizen of the United States, residing at Chicago, county of Cook, State of Illinois, have invented a Method of Producing Oxygen and Apparatus Therefor, of which the following is a specification.

This invention relates to the method and apparatus used in the separation of relatively pure oxygen from the other gases of the atmosphere.

The object of this invention is to provide an economic, rapid and efficient device which will be both light and simple, for separating the oxygen from the other gases of the atmosphere.

The applications of this device will be obvious, but it may be briefly mentioned that it can be used for welding, combustion furnaces, internal combustion engines, and in large sizes for various metallurgical operations, such as smelting furnaces, etc.

It is well understood that present commercial methods of producing oxygen are based upon two principles. One widely used process consists in liquefying the atmosphere, and by fractional distillation of the resultant liquid, separating the oxygen from the other gases.

The other method consists of employing an electrolytic cell in which a direct current is employed to decompose various aqueous solutions, separating the oxygen at one terminal, and the hydrogen, or some other gases at the other terminal.

Both of these processes are very wasteful of energy, when it is considered that the mixture of nitrogen and oxygen which forms the atmosphere is purely physical. It will at once be obvious that the energy required to break down the chemical combination of oxygen and hydrogen is enormous compared to the actual energy necessary to separate by physical means the oxygen from the air.

Air being only a mixture, and not a chemical compound, no energy has to be supplied in its separation to overcome the chemical effect, but we must overcome what may be called the force of diffusion of the two gases, for the separation. Thus from the mechanical standpoint, the energy necessary to separate 5 volumes of air at atmospheric pressure into 1 volume of oxygen and 4 volumes of nitrogen, each at atmospheric pressure, is simply that of bringing up each of the partial pressures of the two gases as they existed in the mixture, separately to that of the original mixture. In other words, it is the energy necessary to compress the oxygen from the 5 volumes at $\frac{1}{5}$ atmospheric pressure to 1 volume at 1 atmospheric pressure plus that to compress 5 volumes of nitrogen at $\frac{4}{5}$ atmospheric pressure into 4 volumes at 1 atmospheric pressure, all cycles being isothermal.

If these processes could be carried out with thermodynamical perfection, the energy necessary to compress the original air isothermally to a pressure of approximately 10 pounds per square inch above the atmosphere would be sufficient to effect its complete separation into pure oxygen and pure nitrogen, each at atmospheric pressure. On the bases of isothermal compression, calculations show the energy required to be about 60 horse-power hours per ton of oxygen separated.

This invention does not pretend to reach the theoretical efficiency, but the above discussion is given to point out the wide departure between the energies now employed in the production of oxygen and that theoretically necessary.

This invention is based, among other things, upon the property of liquid silver of absorbing from the air approximately 22 times its own volume of oxygen at atmospheric pressure, and giving out this oxygen when the pressure is reduced, or the temperature is lowered. Increase of pressure above atmospheric pressure naturally increases the absorption, while the reduction of pressure causes the oxygen to be evolved.

It will be evident that if a device is constructed so that the liquid silver is first submitted to pressure in the presence of the atmosphere, then removed to another chamber in which it is submitted to a lesser pressure, the oxygen absorbed in the pressure chamber will be liberated in the second chamber. If a device is provided to move the silver from the second chamber back to the first chamber, the cycle is completed.

It will be obvious that if the out-going gases, which naturally contain considerable heat, are caused to pass through an economizer, the incoming gas may have its temperature very appreciably raised, so that the heat loss in the cycle will not be excessive.

The elements of a device adapted to perform the functions outlined above are shown in the accompanying drawing.

In the accompanying drawing, Figure I represents the side elevation in section of one form of this device, while Figure II shows a plan. Figure III shows in sectional elevation a modification of the device illustrated in Figures I and II. It will, of course, be understood that the figures are merely illustrative of the general elements, and many modifications of this device are possible and still come within the description of this invention.

Referring to Figures I and II: numeral (1) represents a container which can preferably be made of metal, enclosing a block (2) of refractory material which contains the elements of the device. Block (2) is provided with chamber (3), which serves as a reservoir of fused silver. Chamber (3) is equipped with a nozzle (4) which extends downwardly into the fused silver and has its other end extending into chamber (5). Pipes and refractory blocks here described may be made to advantage from soapstone, lava, alundum, refractory fire-clay, porcelain, etc. At the lower end of chamber (5) is provided a pipe (6), which connects the liquid silver to chamber (7), which contains a pump, or device for moving the liquid silver.

For the purpose of illustration, I have shown the chamber (7) equipped with a rotor (8), which is connected to shaft (9) of motor (10). The rotation of rotor (8) by means of motor (10) serves to circulate the liquid silver indicated by (11), causing it to pass through the tube (12), back into chamber (3).

Chamber (3) is provided with an inlet pipe (13), and an outlet pipe (14); while chamber (5) is provided with an outlet pipe (15). A heating element (26$^A$) is shown, wound around the chambers and pipes.

Pipes (14) and (15) are passed through the heat economizer (21), which consists of thermally conducting tubes 17, 18, and 19 which indicate respectively the outlet pipe for the nitrogen, the outlet pipe for the oxygen and the inlet pipe for the air going to the heat interchanger, enclosed in a shell (20), and insulated by fibrous material (21), to prevent loss of heat. In a similar manner, (22) indicates heat insulation supplied around refractory block (2), serving to prevent the loss of heat while the device is in operation.

Flow controlling numbers (23), (24) and (25) are provided respectively on pipes (19), (17) and (18).

In Figure III (2$^A$) is the refractory block containing chambers (3$^A$), (5$^A$) and (7$^A$), closed at their upper ends and fitted with pipes (14$^A$), (15$^A$), and (13$^A$), respectively. The bottom of chamber (5$^A$) is connected to the bottom of chamber (7$^A$) by a passage-way (6$^A$); and the bottom of chamber (3$^A$) is connected to the upper portion of chamber (5$^A$) by a passage-way (4$^A$). Similarly, the lower portion of chamber (7$^A$) is connected to the upper portion of chamber (3$^A$) by passage (12$^A$).

A check valve (26) is provided in the bottom of chamber (7$^A$) to prevent the exit of liquid from chamber (7$^A$) to (5$^A$), while check valve (27) serves to prevent passage of liquid from (3$^A$) to (7$^A$).

A valve in chamber (28) is provided to control the movement of air and liquid. Chamber (28) contains a cylinder (29), fitted with a valve piston (30), which uncovers ports (31) and (32). A compression spring (33) serves to return piston (30) when displaced. Screw (34) serves to regulate the pressure on spring (33). Pipe (35) connects the valve mechanism with the nitrogen exhaust pipe (14$^A$) of chamber (3$^A$). Insulated chamber (36) serves as the heat economizer and transfers the heat of the out-going gases to the in-coming gases.

The operation of the device shown in Figures I and II, is as follows: The current is first applied to the heating element (26$^A$), which heats refractory block (2) to a temperature such that the silver is thoroughly liquid throughout. The motor (10) is then started and the silver begins to circulate from chamber (7) into chamber (3), and from there through nozzle (4), into chamber (5). The silver then passes from chamber (5) into the pipe 6 and completes the cycle.

A source of air under pressure is then applied to pipe (19), which passes through heat economizer (21$^A$) into pipe (13), over the bath of fused silver in chamber (3), the oxygen there being absorbed, while the nitrogen passes off through pipe (14) and through the heat economizer, serving to preheat the entering air. The controlling member (24) in pipe (17) is so adjusted that the gases leaving through this pipe, which contains nitrogen and some oxygen, exerts a throttling effect, leaving a residual pressure within the chamber (3). The liquid in chamber (3) thus being exposed to oxygen under considerable pressure, absorbs an appreciable amount of oxygen and passes downward to the lower end of tube (4), and out of tube (4) in a spray, into chamber (5). Chamber (5) being maintained at a lower pressure than chamber (3) the oxygen is here given off from the spray of silver and passes out through pipes (15) and (18) to tank, or storage for the oxygen.

The cycle of operations of the modification shown in Figure III, is substantially similar to that above described. The liquid is pumped with air pressure, however, instead of with a rotary pump.

The detailed operation of the modification shown in Figure III is as follows:

Air under pressure enters through the pipe in chamber 28, passes through ports 31, to the heat absorber 21ᴬ, and by means of pipe 13ᴬ enters chamber 7ᴬ. This air pressure serves to close valve 26, thus preventing the liquid in chamber 7ᴬ from passing to chamber 5ᴬ. The air, however, flows through the small port at the upper part of chamber 7ᴬ and bubbles through the liquid in chamber 3ᴬ.

The oxygen is here absorbed by the liquid, while the nitrogen passes upward through the heat absorber and applies pressure on the plunger 30 of chamber 28. When the pressure has reached a sufficient value, plunger 30 closes the air supply to port 31, and at substantially the same time liquid is forced through pipe 4ᴬ from chamber 3ᴬ into chamber 5ᴬ.

The absorbed oxygen is released in chamber 5ᴬ by reason of the lower pressure, while the liquid passes back into chamber 7ᴬ by reason of the greater pressure in 5ᴬ than in 7ᴬ.

The cycle is then repeated, since the spring 33 will now force plunger 30 down, allowing air under pressure to again enter chamber 7ᴬ.

The pump referred to as illustrated in Figure III is the air operated pulsometer described in the above outline of the cycle of operations of Figure III.

It will be obvious that other materials than metallic silver may be employed in this cycle, metallic silver merely being one substance which absorbs large quantities of oxygen, and is relatively inactive, and therefore does not attack the walls of the container. Examples of other metals which may be employed are lead, gold, alloys, solutions of plumbic salts in various alkalis, nickel salts, manganese salts, mercuric salts, various fused oxides, and many other materials. Barium oxide in solution of other oxides, silicates, etc., are available.

It will also be understood that the device which is here illustrated schematically as a pump, may be constructed in many other different forms. It may be built similarly to the standard piston pumps, gear pumps, pulsometers and other well known devices, one of which is illustrated in Figure III.

It will also be evident that the heat interchanging device may be constructed in many other different ways, the form shown merely being one which is satisfactory in principle.

In considering the operation of the device shown in Figures I and II, it will be evident that the amount of free oxygen which can be produced will be approximately proportional to the speed of circulation of the liquid silver, other factors remaining constant; variations in the partial pressure of the oxygen in the air and the oxygen supply line will also affect the amount of oxygen produced in a given time. In other words, since the silver may carry approximately twenty times its volume of oxygen, circulating 10 cubic inches per second would mean the separation of approximately 200 cubic inches of oxygen per second, or approximately 6½ cubic feet of oxygen per minute. To produce 200 cubic inches of oxygen per second would require the circulation of not less than 1000 cubic inches of air at normal pressure. It will therefore be evident that the capacity of a device constructed along the lines described above, may have an extremely large capacity with relatively very small expense. Since the energy consumed in the production of oxygen in this manner is applied to only three purposes, it will be evident that the oxygen may be produced very cheaply. The energy necessary for the separation of oxygen by this device is employed, first to compress the air: second, to heat the air from normal temperature to that of the exhaust gases and, third: to pump the silver from the low pressure container to the high pressure container. It will be obvious that the energy consumed in each of these cases is negligible compared to the energy consumed in the electrolytic separation of oxygen, or the fractional solution method.

As a matter of illustration, it may be stated that pressures of 150 pounds per square inch for the incoming air have been found ample, and an operating temperature in the neighborhood of 1000° centigrade is satisfactory.

From the standpoint of partial pressures, metallic silver, which absorbs about 22 volumes of oxygen from the air, will absorb about 110 volumes from pure oxygen. Therefore the absorption of oxygen at a pressure of air of 60 pounds per square inch absolute (or 45 lbs. gage), will exactly equal the absorption at 12 pounds pressure from an atmosphere of pure oxygen.

In the following claims where reference is made to a substance which absorbs oxygen exclusively, it is intended to refer of course, to commercial quantities. Thus, no known material will absorb oxygen without absorbing traces of nitrogen. The substances specified in this application, however, are highly selective so that the amount of nitrogen absorbed is negligible from a commercial standpoint.

Having now fully described the invention, what is claimed as new and desired to protect by Letters Patent is as follows;

I claim:

1. The process of selectively separating oxygen from nitrogen by first passing compressed air through a liquid maintained at a high temperature which absorbs oxygen but very little nitrogen, and then transferring the liquid still under pressure to a chamber of lower pressure where the oxygen is released.

2. The process of selectively separating oxygen from nitrogen by first passing compressed air through a liquid maintained at a high temperature which absorbs oxygen but very little nitrogen, then transferring the liquid to a chamber of lower pressure, where the oxygen is released, the excess nitrogen and oxygen being used to preheat the incoming air.

3. A device for selectively separating oxygen from nitrogen, which comprises a high pressure chamber, a low pressure chamber, a liquid moving device, channels for conducting fluids successively from chamber to chamber, and a liquid capable of absorbing oxygen but very little nitrogen, said liquid arranged to move from chamber to chamber means for maintaining such liquid oxygen absorber at a high temperature.

4. A device for selectively separating oxygen from nitrogen, which comprises a liquid capable of absorbing oxygen but very little nitrogen, an absorption chamber, an evolution chamber, communicating passageways between said chambers, and means for moving the liquid from the absorption chamber to the evolution chamber and means for heating said liquid.

5. In a device for selectively separating oxygen from nitrogen, a liquid capable of absorbing oxygen but very little nitrogen, said liquid designed to operate at high temperatures, and capable of evolving a portion of the absorbed oxygen with change of pressure.

6. A device for selectively separating oxygen from nitrogen, comprising a bath of fluid capable of absorbing oxygen but very little nitrogen, a heating device for said fluid, an absorption chamber, an evolution chamber, passageways between said chambers, valves in said passageways, and means for periodically applying and removing pressure in said chambers.

7. A device for selectively separating oxygen from nitrogen, comprising a bath of oxygen absorbing fluid, means for heating said fluid, an absorption chamber, an evolution chamber, a pump chamber, passageways between said chambers, valves in said passageways, and a pressure actuating means for periodically applying and removing pressure in said pump chamber.

8. A device for selectively separating oxygen from nitrogen, comprising a bath of liquid silver, an absorption chamber, an evolution chamber, a means for continuously moving the silver from the absorption chamber to the evolution chamber.

WILLIAM A. DARRAH.